(No Model.)
J. RAMSEY, Jr.
POWER TRANSMITTER FOR RAILWAY SIGNALS.
No. 427,361. Patented May 6, 1890.
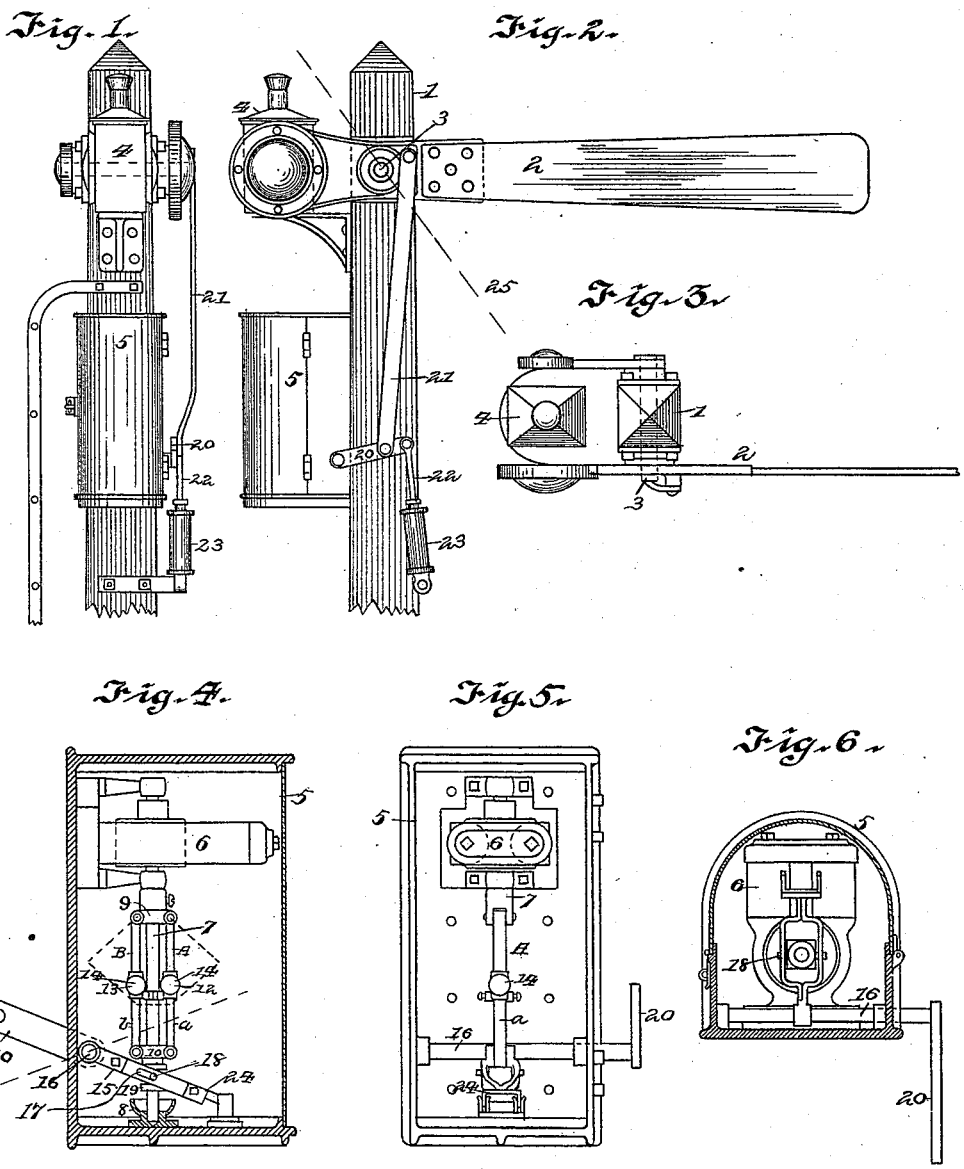
Witnesses
J. Watson Sims
George Ashton
Inventor
Joseph Ramsey Jr.
By his Attorney
Wood & Boyd

UNITED STATES PATENT OFFICE.

JOSEPH RAMSEY, JR., OF CINCINNATI, OHIO, ASSIGNOR OF ONE-HALF TO FREDERIC C. WEIR, OF SAME PLACE.

POWER-TRANSMITTER FOR RAILWAY-SIGNALS.

SPECIFICATION forming part of Letters Patent No. 427,361, dated May 6, 1890.

Application filed August 22, 1889. Serial No. 321,602. (No model.)

*To all whom it may concern:*

Be it known that I, JOSEPH RAMSEY, Jr., a citizen of the United States, and a resident of Cincinnati, in the county of Hamilton and State of Ohio, have invented certain new and useful Improvements in Power-Transmitters for Railway-Signals, of which the following is a specification.

My invention relates to a device adapted to be used in connection with an electric motor to operate signals, switches, and other similar mechanism where the application of the power must be without shock and where a gradual increasing motion is required.

I have shown my device as used in combination with a motor and signal mechanism shown in the application of Frederic C. Weir and Joseph Ramsey, Jr., Serial No. 304,152, filed March 21, 1889.

The object of my invention, as shown in the annexed drawings, is to apply the power to the signal gradually and to prevent shock or jars in stopping and starting the mechanism, or damage the motor when stopped by accident or design. This is accomplished by means of a gyratory power-transmitter. Other objects of my invention will be fully set forth in the description of the accompanying drawings making a part of this specification, in which—

Figure 1 is an elevation of my improvement attached to a signal-post. Fig. 2 is a transverse side elevation of Fig. 1. Fig. 3 is a top plan view of Fig. 1. Fig. 4 is a longitudinal section of the box, showing the motor and driving connections in elevation. Fig. 5 is a transverse elevation of the same, showing the door removed. Fig. 6 is a bottom plan view of Fig. 5.

1 represents a signal-post.

2 represents the signal-blade journaling upon the pivot 3.

4 represents the lamp.

5 represents the motor-box.

6 represents an ordinary electric motor of sufficient power to move the signal-blade through its connecting mechanism.

7 represents the driving-shaft of the motor. Said shaft projects across the box and is journaled in the bearing 8 attached to the end of the box.

The connecting mechanism consists of gyratory links hinged together at their center, and the parts are constructed as follows:

9 represents a collar containing notches or ears to which links $A^a$ $B^b$ are pivoted. Said collar 9 is connected rigidly to shaft 7. 10 represents a collar on the opposite end of said shaft and provided with ears into which the links $A^a$ $B^b$ are jointed. Links $A^a$ $B^b$ are hinged together at points 12 and 13.

14 represents an enlargement of one of the links $A^a$ $B^b$, so as to get increased weight at the center of the said links. As the shaft 7 is driven by the motor the collar 10 is drawn up on the shaft by the spreading of the links at their center, so that said links occupy the position shown in dotted lines, Fig. 4, when the motor has attained its full speed. This movement of the collar 10 is a gradual increasing one, operated somewhat in the manner of a governor.

15 represents an oscillating arm keyed to shaft 16, which shaft is journaled to the sides of the box. 17 represents a slot in the free end of said oscillating arm, through which projects a pin 18, which is borne by the collar 19, that swivels in the groove in the outer periphery of collar 10, so that said pin may be held in engagement with the slot while the collar 10 is free to revolve.

20 represents a crank-arm rigidly connected to shaft 16 and projecting out laterally from the motor-box.

21 represents a pitman hinged to the signal-blade 2 and to the crank-arm 20.

22 represents a plunger-rod, which carries a dash-pot moving in the cylinder 23, so as to cushion the upward and downward movement of the pitman 21. The said cylinder 23 may be provided with air-valves to cushion on both the upward and downward movement, and are of ordinary construction.

24 represents an electric terminal or connecting point, with which oscillating arm 15 is in contact when the signal is at "danger," so that the "danger" position of the signal may be electrically indicated.

The operation of the device is as follows: The signal being connected up, as here shown, the signal-blade 2 stands clamped at "danger." The motor is employed to pull it down in the direction shown in dotted lines 25, which is the "safety" position. This is accomplished by setting the motor 6 in operation to revolve shaft 7 and the links $A^a$ $B^b$, the centrifugal force of which draws them into the position shown in dotted lines, Fig. 4, thereby moving the collar 10 up, and the pin 18, working in slot 17, moves the oscillating arm 15 and rocks the shaft 16, moving crank-arm 20 downward, bringing the blade 2 into the "safety" position, in which position it is held so long as the motor is in operation. When the motor is stopped, the signal 2 is returned into the "danger" position automatically by reason of its being overweighted at its rear end. The air-cushion 23 slows up the movement and prevents the sudden stopping or jarring of the parts. As soon as the revolution of the motor ceases the links $A^a$ $B^b$ are drawn back into position automatically by the overweight of the signal-blade 2.

Having described my invention, what I claim is—

1. The combination, with a signal-post and a swinging signal, of an electric motor having a rotating shaft, gyratory transmitters rigidly hinged at one end to the shaft and movable laterally at the other end on the shaft, a rock-shaft having a connection with and rocked by the laterally-movable end of the gyratory transmitters, and connections between the rock-shaft and the swinging signal, substantially as described.

2. The combination of an electric motor, the gyratory transmitter-links $A^a$ $B^b$, the vibratory arm 15, loosely connected to said links, with crank and link connections, and the signal-blade 2, whereby the blade is moved by the revolution of the motor, substantially as specified.

3. The combination of an electric motor, the gyratory transmitting-links $A^a$ $B^b$, the vibrating arm 15, loosely connected to said links, with crank and link connections, and the signal-blade 2, whereby the blade is moved in one direction by the revolution of the motor, and being free to move in the opposite direction when the motor is stopped, substantially as specified.

4. The combination, with the electric motor, of the gyratory transmitting-links, the vibrating arm 15, loosely hinged to said links, and with crank and link connections operating the signal-blade, and the electric terminal 24, which is in contact with said arm 15 when the signal is at "danger," substantially as specified.

In testimony whereof I have hereunto set my hand.

JOSEPH RAMSEY, Jr.

Witnesses:
 RUFUS S. SIMMONS,
 T. SIMMONS.